United States Patent
Chen et al.

(10) Patent No.: US 8,400,127 B2
(45) Date of Patent: Mar. 19, 2013

(54) AVERAGE CURRENT REGULATOR AND DRIVER CIRCUIT THEREOF AND METHOD FOR REGULATING AVERAGE CURRENT

(75) Inventors: An-Tung Chen, Pingzhen (TW); Isaac Y. Chen, Zhubei (TW); Chien-Fu Tang, Hsinchu (TW)

(73) Assignee: Richtek Technology Corporation R.O.C., Hsin-Chu (TW)

( * ) Notice: Subject to any disclaimer, the term of this patent is extended or adjusted under 35 U.S.C. 154(b) by 395 days.

(21) Appl. No.: 12/878,185

(22) Filed: Sep. 9, 2010

(65) Prior Publication Data

US 2011/0068761 A1 Mar. 24, 2011

Related U.S. Application Data

(60) Provisional application No. 61/243,606, filed on Sep. 18, 2009.

(51) Int. Cl.
*G05F 1/40* (2006.01)
(52) U.S. Cl. ........................ 323/282; 323/285
(58) Field of Classification Search .................. 323/222, 323/224, 282–290
See application file for complete search history.

(56) References Cited

U.S. PATENT DOCUMENTS

| | | | | |
|---|---|---|---|---|
| 4,117,332 A * | 9/1978 | Felton et al. | ................. | 250/374 |
| 4,309,650 A * | 1/1982 | Boros et al. | ................. | 323/283 |
| 6,670,794 B1 * | 12/2003 | Wang et al. | ................. | 323/213 |
| 6,987,380 B1 * | 1/2006 | Lee | ................. | 323/285 |
| 7,196,503 B2 * | 3/2007 | Wood et al. | ................. | 323/276 |
| 7,466,116 B2 * | 12/2008 | Sato et al. | ................. | 323/285 |
| 7,602,155 B2 * | 10/2009 | Markowski | ................. | 323/222 |
| 7,646,253 B2 * | 1/2010 | Kwan et al. | ................. | 331/1 R |
| 2005/0225307 A1 * | 10/2005 | Sato et al. | ................. | 323/282 |
| 2010/0156872 A1 * | 6/2010 | Pankaj et al. | ................. | 345/211 |
| 2012/0126759 A1 * | 5/2012 | Lee et al. | ................. | 323/205 |

* cited by examiner

*Primary Examiner* — Adolf Berhane
*Assistant Examiner* — Nusrat Quddus
(74) *Attorney, Agent, or Firm* — Tung & Associates

(57) ABSTRACT

The present invention discloses an average current regulator, a driver circuit of an average current regulator, and a method for regulating an average current. The average current regulator includes: a power stage including at least one power transistor which switches according to a pulse width modulation (PWM) signal to convert an input voltage to an output current; a feedback circuit coupled to the power stage, for generating a feedback signal; an ON-time controller coupled to the feedback circuit, for receiving the feedback signal and generating an ON-time signal according to the feedback signal and an average reference signal relating to a target average current; and a PWM controller, for generating the PWM signal according to the ON-time signal to regulate the average of the output current to the target average current.

44 Claims, 15 Drawing Sheets

Prior Arts

Detect t1 and
Control T2=T1

Fig. 9B Detect t1 and Control T2=T1

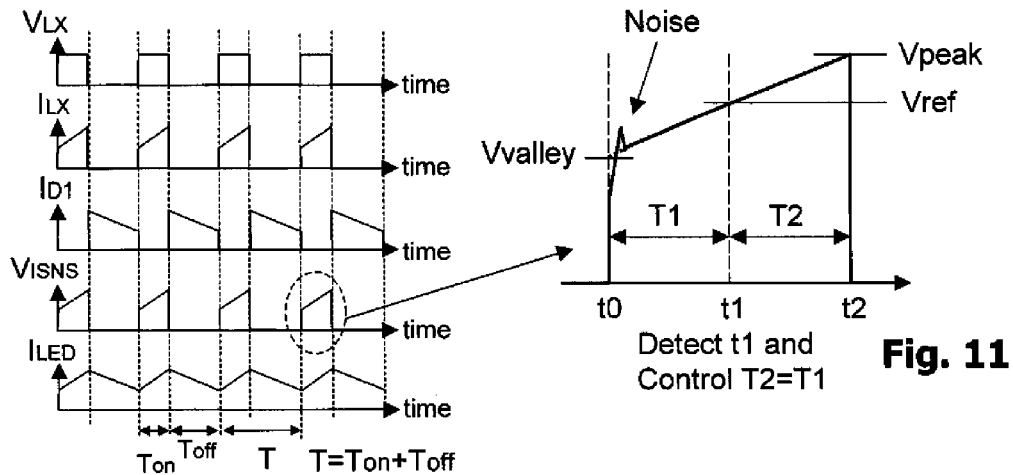
Fig. 11A
Fig. 11B
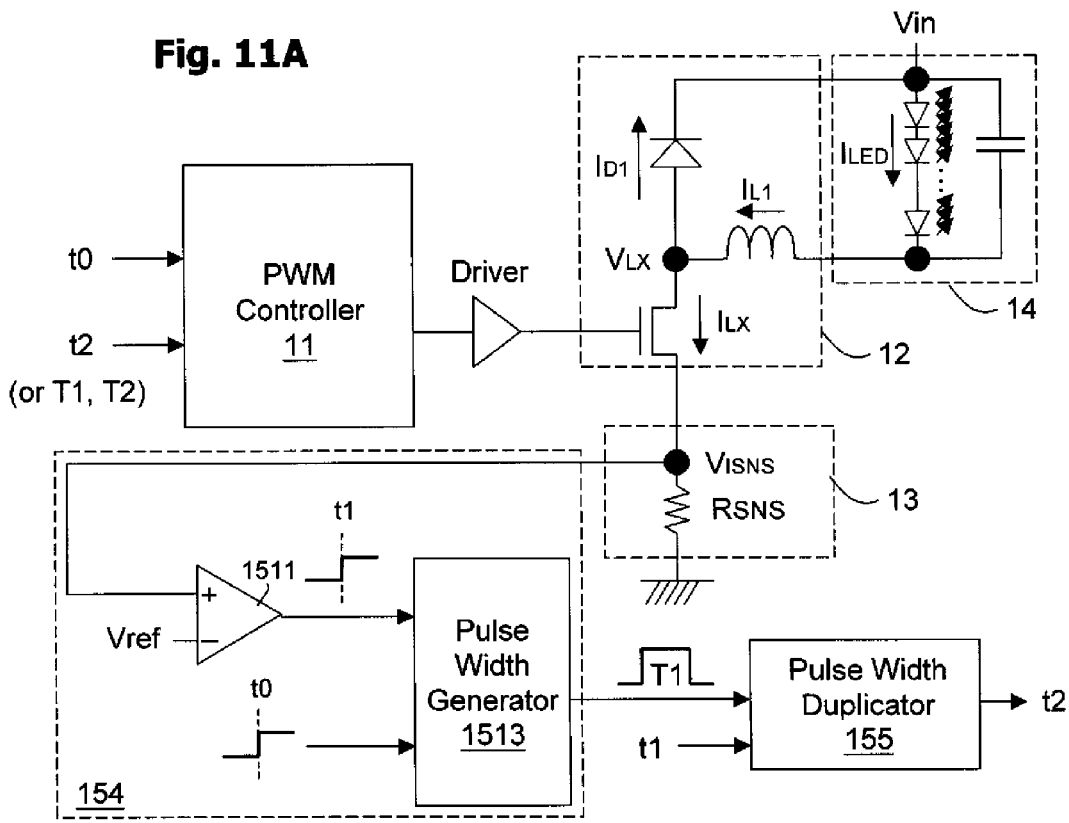
Fig. 12

Force T2=T1 using counter

AVERAGE CURRENT REGULATOR AND DRIVER CIRCUIT THEREOF AND METHOD FOR REGULATING AVERAGE CURRENT

CROSS-REFERENCE

The present invention claims priority to U.S. provisional application No. 61/243,606, filed on Sep. 18, 2009.

BACKGROUND OF THE INVENTION

1. Field of Invention

The present invention relates to an average current regulator, a driver circuit for an average current regulator, and a method for regulating average current. Particularly, it relates to an average current regulator which controls the ON-time of a power transistor by detecting the time point when the output current reaches an average current; it also relates to a driver circuit and a method for use in such average current regulator.

2. Description of Related Art

FIG. 1 shows a circuit diagram of a typical current regulator, in which a PWM (pulse width modulation) controller 11 controls at least one power transistor in a power stage circuit 12 to convert an input voltage Vin to an output current Iout which is supplied to a load circuit such as an LED (light emitted diode) circuit 14 shown in this figure. A feedback circuit 13 generates a feedback signal related to the output current Iout, and inputs the feedback signal to the PWM controller 11, such that the PWM controller 11 can control the power transistor in the power stage 12 to regulate the output current Iout to a predetermined target. The power stage circuit 12 may be, but is not limited to, a synchronous or asynchronous buck, boost, inverting or buck-boost converter as shown in FIGS. 2A-2I.

In the prior art, the object to be regulated is the peak current of the output current Iout, that is, the current regulator regulates the peak current of the output current Iout to the predetermined target. However, referring to the two current signals 310 and 320 shown in FIG. 3, although the peak current of the current signal 310 is the same as the current signal 320, the average current 1 of the current signal 310 is different from the average current 2 of the current signal 320. In some applications, such as in the case of FIG. 1 for controlling the LED circuit 14, this is disadvantageous because the LED circuit 14 needs a stable and well-controlled average current such that the brightness of the LEDs is uniform and stable.

U.S. Pat. No. 7,388,359 discloses an average current control circuit as shown in FIG. 4, and its mechanism of controlling the average current as shown in FIG. 5. However, in this prior art, because of the noise in the operation of the power switches, which results from the coupling of the power switches and the reverse diode current, the accuracy of the average current is not optimum.

In view of the foregoing, the present invention provides an average current regulator, a driver circuit for an average current regulator, and a method for regulating average current, to overcome the drawbacks in the prior art.

SUMMARY OF THE INVENTION

The first objective of the present invention is to provide an average current regulator.

The second objective of the present invention is to provide a driver circuit for an average current regulator.

The third objective of the present invention is to provide a method for regulating average current.

To achieve the objectives mentioned above, from one perspective, the present invention provides an average current regulator comprising: a power stage including at least one power transistor which switches according to a PWM signal to convert an input voltage to an output current; a feedback circuit coupled to the power stage for generating a feedback signal, wherein the feedback signal has an extreme value; an ON-time controller coupled to the feedback circuit for receiving the feedback signal, and generating an ON-time signal according to the feedback signal and an average reference signal related to a target average current; and a PWM controller generating the PWM signal according to the ON-time signal to regulate an average of the output current to the target average current.

From another perspective, the present invention provides an average current regulator driver circuit for driving a power stage, wherein the power stage has at least one power transistor which switches according to a PWM signal to convert an input voltage to an output current, and the power stage is coupled to a feedback circuit which generates a feedback signal, the driver circuit comprising: an ON-time controller coupled to the feedback circuit for receiving the feedback signal, and generating an ON-time signal according to the feedback signal and an average reference signal related to a target average current; and a PWM controller generating the PWM signal according to the ON-time signal to regulate an average of the output current to the target average current.

In the aforementioned average current regulator or average current regulator driver circuit, the On-time controller obtains a first ON-time which is a period of time from an initial time point when the power transistor is turned ON to a time point when the feedback signal reaches the average reference signal, and generates a second ON-time proportional to the first ON-time, wherein the ON-time of the PWM signal is the sum of the first ON-time and the second ON-time.

In one embodiment of the present invention, the ON-time controller includes: a time detector circuit receiving the feedback signal, the average reference signal, and an extreme signal related to the extreme value of the feedback signal, and generating a first ON-time signal having the first ON-time and a second ON-time signal having the second ON-time; a pulse width comparator comparing the pulse widths of the first ON-time signal and the second ON-time signal, and outputting the comparison result; and an extreme value adjustor circuit adjusting the extreme signal according to the comparison result of the pulse width comparator and feeding back the extreme signal to the time detector circuit, such that the second ON-time approaches a target ratio of the first ON-time.

In another embodiment of the present invention, the ON-time controller includes: a first ON-time detector circuit receiving the feedback signal and the average reference signal, and generating a first ON-time signal having the first ON-time; and a pulse width duplicator circuit coupled to the first ON-time detector circuit, for generating a second ON-time signal having the second ON-time according to the first ON-time signal.

From yet another perspective, the present invention provides a method for regulating average current comprising: switching at least one power transistor of a power stage according to a PWM signal to convert an input voltage to an output current; generating a feedback signal according to the output current, wherein the feedback signal has an extreme value; receiving the feedback signal, and generating an ON-time signal according to the feedback signal and an average reference signal related to a target average current; and generating the PWM signal according to the ON-time signal to regulate an average of the output current to the target average current.

The objectives, technical details, features, and effects of the present invention will be better understood with regard to the detailed description of the embodiments below.

BRIEF DESCRIPTION OF THE DRAWINGS

FIGS. 9A and 9B show one example of the signal waveforms of a regulator.

FIGS. 11A and 11B show one example of the signal waveforms of a regulator.

FIG. 12 shows an embodiment of a regulator with an open loop ON-time controller.

DESCRIPTION OF THE PREFERRED EMBODIMENTS

The basic idea of the present invention is to detect a time point when the output current of a current regulator reaches a target average current, and to control the ON-time of a PWM signal such that the ON-time is about twice the time period from an initial time point to the time when the output current reaches the average current; thus, the average of the output current is regulated at a predetermined target. This approach also prevents the power transistor operation noise resulting from the coupling effect of the power transistors and the reverse diode current from impacting the accuracy of the average current. The basic idea can be modified in various ways, which will be described in the last part of this section "DESCRIPTION OF THE PREFERRED EMBODIMENTS".

Figure 6:
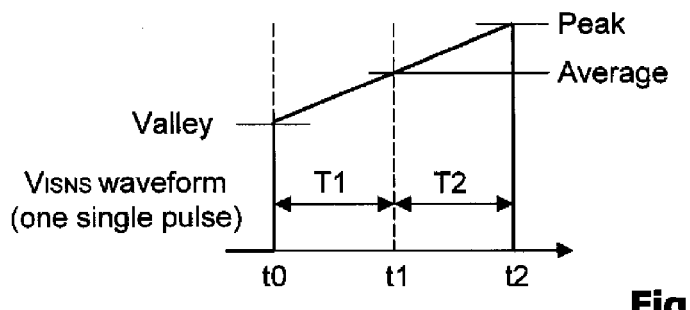
FIG. 6 shows the waveform of one pulse of the feedback signal of the regulator.

FIG. 6 shows the waveform of a feedback signal $V_{SNS}$. The feedback signal $V_{SNS}$ indicates the current through the power transistor during ON time of the power transistor, and it can be obtained by detecting the voltage at the node $V_{SNS}$, as referring to FIGS. 10, 12, and 14-19. FIG. 6 shows the waveform of one single pulse which has a trapezoid shape, and its middle time point, i.e., the first time point t1, is a time point when the output current Iout reaches the target average current. The time period from the initial time point t0 to the first time point t1 is a first ON-time T1. The present invention detects the middle time point, i.e., the first time point t1, and controls a second ON-time T2 such that T2=T1, wherein the second time T2 is a time period from the first time point t1 to a time point t2 when the power transistor is turned OFF. Thus, the total ON-time Ton=T1+T2, and at the second time point t2, both the output current Iout and the feedback signal $V_{SNS}$ reach a local maximum, i.e., peak value. The present invention controls the ON-time period of the power transistor, i.e. the ON-time Ton, to be about twice the first ON-time T1, so that the average of the output current Iout can be accurately controlled at the predetermined target average current.

Figure 7:
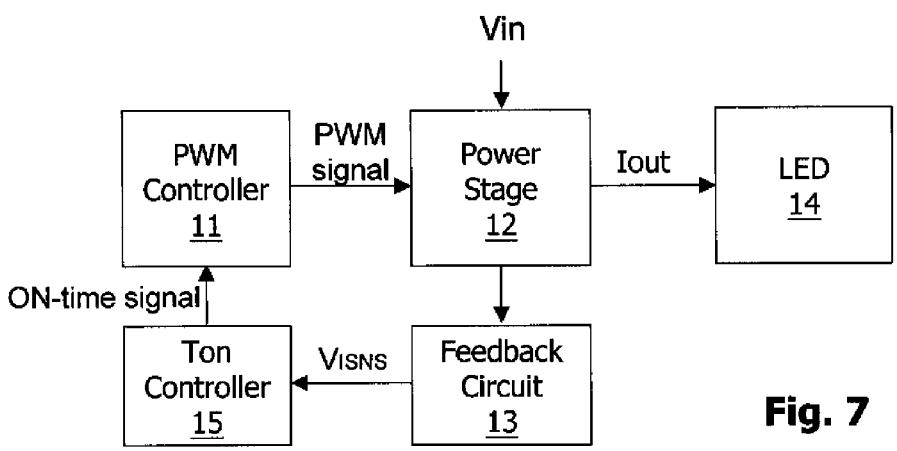
FIG. 7 shows an embodiment of the basic structure of the present invention.

FIG. 7 shows an embodiment of the basic structure of the present invention. The average current regulator as shown in this figure is different from the prior art by an ON-time controller 15 coupled to the feedback circuit 13. The ON-time controller 15 receives the feedback signal $V_{SNS}$, and generates an ON-time signal (Ton) according to the feedback signal $V_{SNS}$. A PWM controller 11 generates a PWM signal and controls the ON-time of the PWM signal according to the ON-time signal to adjust the average of the output current Iout to a stable target average current. In this embodiment, the ON-time signal may be the second time point t2, the ON-time Ton, the first ON-time T1 and the second ON-time T2 as two separated signals, or any other signals which can be used for determining the ON-time of the PWM signal, such as a signal related to the peak.

Figure 8A:
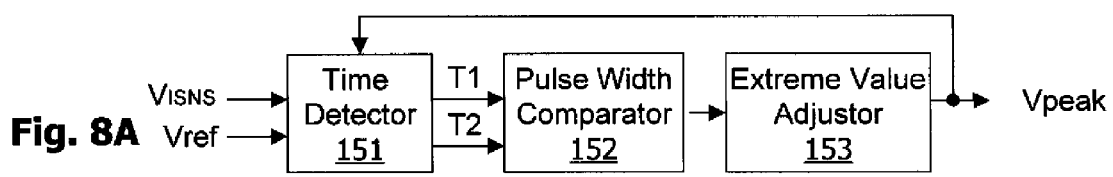
FIG. 8A shows an embodiment of the ON-time controller 15 by closed loop control.
Figure 8B:
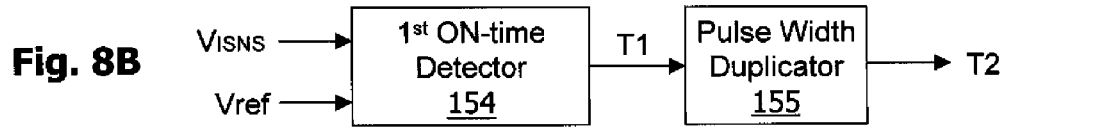
FIG. 8B shows an embodiment of the ON-time controller 15 by open loop control.

There are at least two ways to embody the ON-time controller 15, as shown in FIGS. 8A and 8B. FIG. 8A shows a closed loop embodiment of the ON-time controller 15. As shown in this figure, a time detector circuit 151 receives the feedback signal $V_{SNS}$, a reference signal Vref related to the average current (hereinafter referred to as "the average reference signal Vref", although it may not exactly correspond to the average current as explained in the last part of this section), and a peak signal Vpeak; the time detector circuit 151 generates a first ON-time signal and a second ON-time signal. The first ON-time signal and the second ON-time signal have ON-times which are the first ON-time T1 and the second ON-time T2, respectively. A pulse width comparator 152 compares the first ON-time signal and the second ON-time signal, and outputs the comparison result. The purpose of the comparison is to obtain the difference between the first ON-time T1 and the second ON-time T2. An extreme value adjustor circuit 153 adjusts the peak signal Vpeak according to the comparison result of the pulse width comparator 152 and feeds the peak signal Vpeak back to the time detector circuit 151, such that the second ON-time T2 approaches the first ON-time T1 (or a target ratio thereof, as explained in the last part of this section).

FIG. 8B shows an open loop embodiment of the ON-time controller 15. As shown in this figure, a first ON-time detector circuit 154 receives the feedback signal $V_{SNS}$ and the average reference signal Vref, and it outputs the first ON-time signal. The first ON-time signal has an ON-time which is the first ON-time T1. A pulse width duplicator circuit 155 duplicates the first ON-time signal to generate the second ON-time signal which has about the same ON-time as the first ON-time T1 (or has about the same ON-time as a ratio of the first ON-time T1, as explained in the last part of this section).

In the aforementioned two embodiments of the ON-time controller 15, the initial time point t0, which is a starting time point when the PWM signal switches ON, may be obtained in the circuit in various ways. For example, it may be obtained by, but not limited to, detecting a rising edge of the feedback signal V<sub>ISNS</sub>. Some other examples to obtain the initial time point t0 will be given later.

Figure 9A:
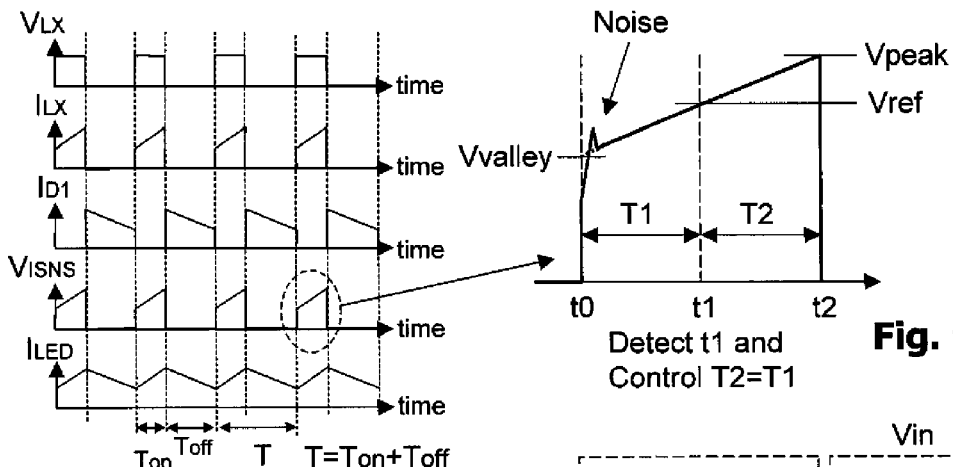
Figure 10:
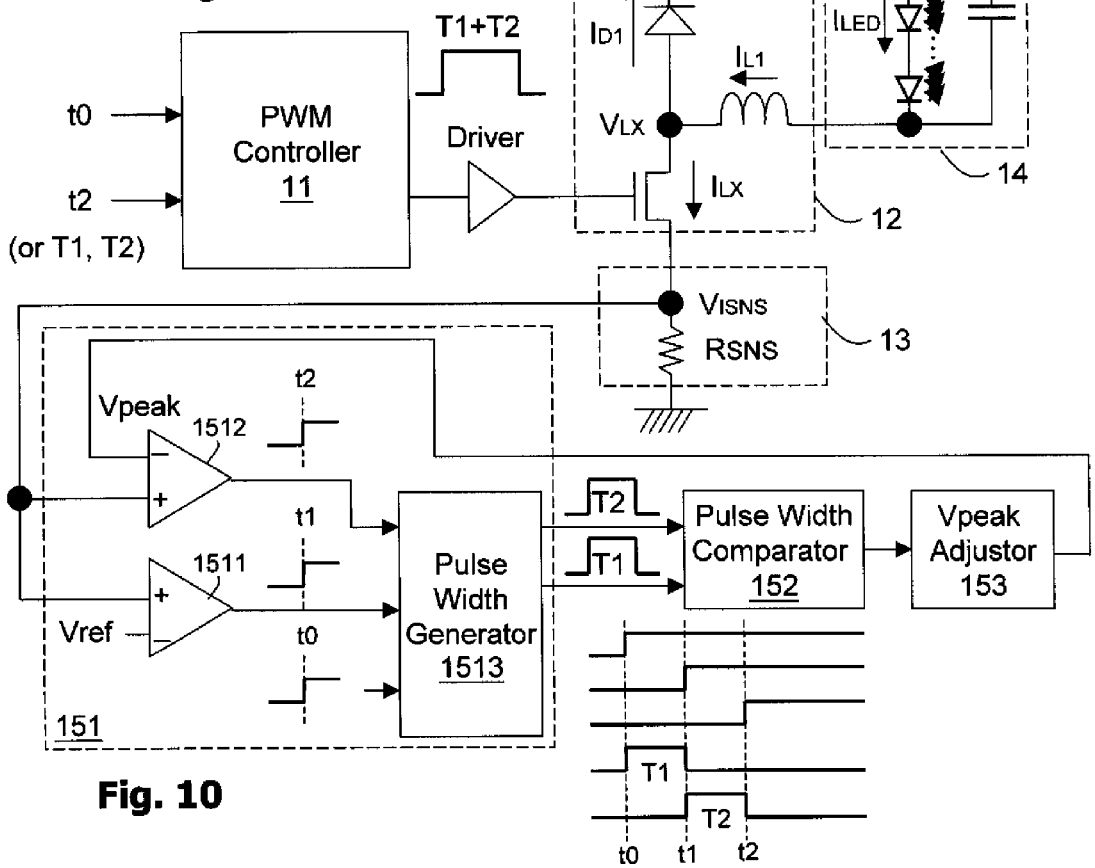
FIG. 10 shows an embodiment of a regulator with a closed loop ON-time controller.

Referring to FIGS. 9A-9B and FIG. 10, FIG. 10 shows a more specific embodiment of the regulator with a closed loop ON-time controller. FIG. 9A shows the waveforms of the diode current ID1, the power transistor current ILX, the inductor voltage VLX, the LED current ILED of an LED circuit 14, and the feedback signal V<sub>ISNS</sub> of a feedback circuit 13. The embodiment shown in FIG. 10 employs the asynchronous buck power stage 12 shown in FIG. 21 as an example, but certainly the present invention can be applied to other types of power converters.

More specifically, in FIG. 10, the feedback signal V<sub>ISNS</sub> is inputted to a first comparator 1511 and a second comparator 1512 of the time detector circuit 151. The first comparator 1511 compares the feedback signal V<sub>ISNS</sub> and the average reference signal Vref, and generates a first time point signal accordingly. As shown in FIG. 10, the first time point signal switches level at the first time point t1. The second comparator 1512 compares the feedback signal V<sub>ISNS</sub> and the peak signal Vpeak, and generates a second time point signal accordingly. As shown in FIG. 10, the second time point signal switches level at the second time point t2. A pulse width generator circuit 1513 receives an initial time point signal related to the initial time point t0, the first time point signal related to the first time point t1, and the second time point signal related to the second time point t2, and generates the first ON-time signal with a pulse width of T1 and the second ON-time signal with a pulse width of T2 according to t0, t1, and t2, as shown in the lower-right part of FIG. 10. Next, a pulse width comparator 152 compares the first ON-time signal and the second ON-time signal, and outputs the comparison result to the extreme value adjustor circuit 153. The extreme value adjustor circuit 153 adjusts the peak signal Vpeak according to the comparison result outputted by the pulse width comparator 152 and feeds the peak signal Vpeak back to the time detector circuit 151. By the mechanism of closed loop control, the second ON-time T1 will approach the first ON-time T1.

As mentioned above, the initial time point t0 maybe obtained in various ways. Referring to FIG. 10, in addition to obtaining it from the feedback signal V<sub>ISNS</sub>, the initial time point t0 may also be obtained from, but not limited to, the PWM signal, the power transistor current signal ILX, or the inductor voltage signal VLX. If the initial time point t0 is obtained from the rising edge of the feedback signal V<sub>ISNS</sub>, it is preferred that the noise of the feedback signal V<sub>ISNS</sub> should be filtered out. Details of such noise filtering will be addressed later with reference to FIG. 13.

Referring to FIGS. 11A-11B and FIG. 12, different from FIG. 10, FIG. 12 shows a more specific embodiment of the regulator with an open loop ON-time controller, also employing the asynchronous buck power stage 12 shown in FIG. 21 as an example. FIG. 11A shows the waveforms of the diode current ID1, the power transistor current ILX, the inductor voltage VLX, the LED current ILED of the LED circuit 14, and the feedback signal V<sub>ISNS</sub> of the feedback circuit 13.

More specifically, FIG. 12 shows that the feedback signal V<sub>ISNS</sub> is inputted to the first comparator 1511 of the first ON-time detector circuit 154. The first comparator 1511 compares the feedback signal V<sub>ISNS</sub> with the average reference signal Vref, and generates the first time point signal accordingly. As shown in FIG. 12, this first time point signal switches level at the first time point t1. The initial time point t0 may be obtained by any method mentioned above. The initial time point signal related to the initial time point t0 and the first time point signal related to the first time point t1 are inputted to the pulse width generator circuit 1513, and the pulse width generator circuit 1513 generates the first ON-time signal with a pulse width of T1 according to t0 and t1. Next, the pulse width duplicator circuit 155 duplicates the pulse width of the first ON-time signal to generate the second ON-time signal, and outputs the result to the PWM controller 11, such that the ON-time of the PWM signal approaches twice the first ON-time T1.

Several embodiments with more specific circuit details will be described below for better illustrating the closed loop control structure shown in FIGS. 8A, 9A-9B and 10. It should be understood that the same concept can be embodied by many ways which cannot be all listed here. The embodiments below are for demonstrating that the present invention is practical, but not for limiting the scope of the present invention.

Figure 13:
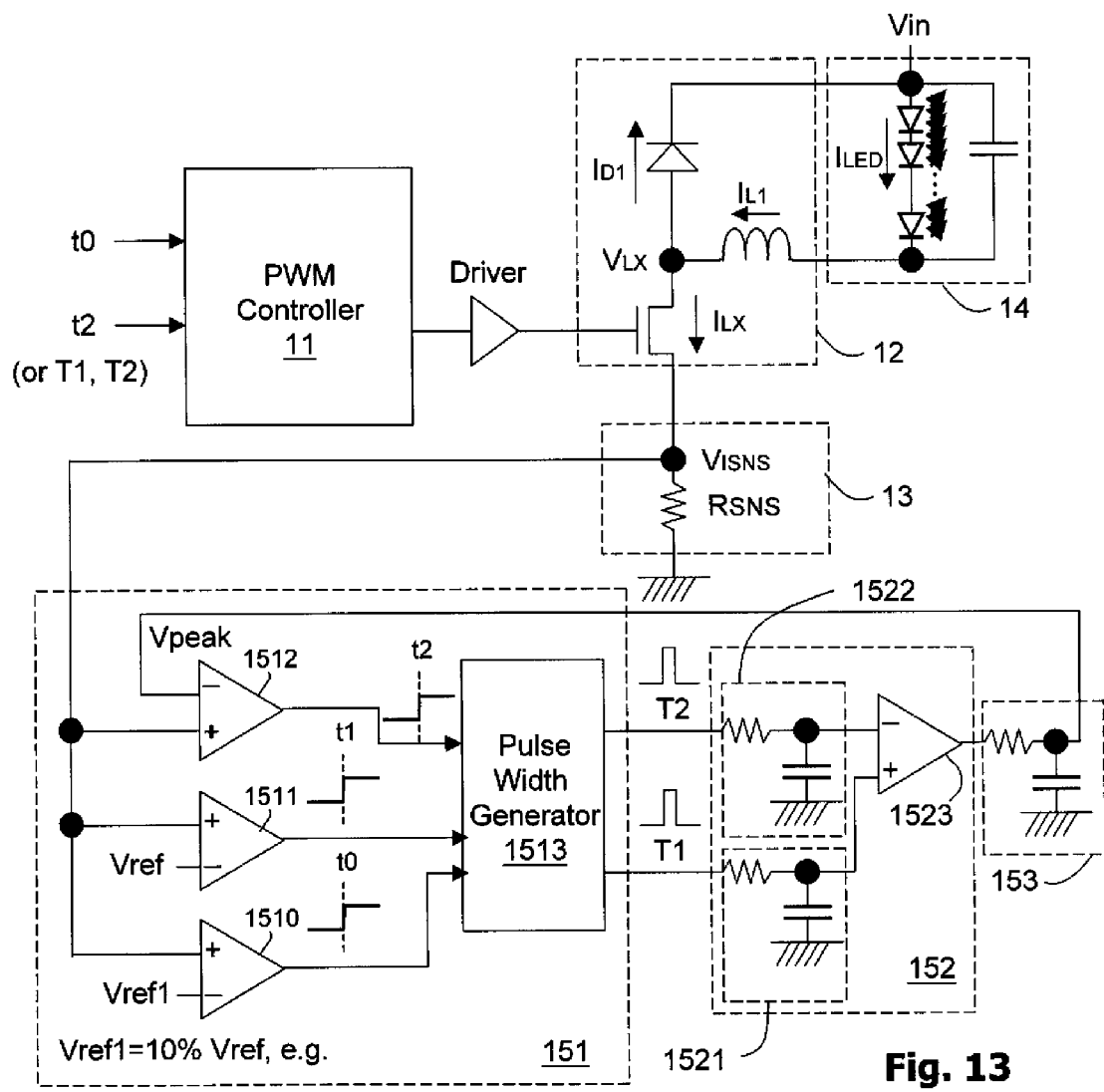
FIGS. 13-17 show embodiments of regulators with closed loop ON-time controllers.

FIG. 13 shows a more specific embodiment of the circuit shown in FIG. 10. In this embodiment, the feedback signal V<sub>ISNS</sub> is inputted to the first comparator 1511, the second comparator 1512, and a third comparator 1510 of the time detector circuit 151. The first comparator 1511 compares the feedback signal V<sub>ISNS</sub> with the average reference signal Vref, and generates the first time point signal accordingly. As shown in FIG. 13, the first time point signal switches level at the first time point t1. The second comparator 1512 compares the feedback signal V<sub>ISNS</sub> with the peak signal Vpeak, and generates the second time point signal accordingly. As shown in FIG. 13, the second time point signal switches level at the second time point t2. In addition, the third comparator 1510 obtains the initial time point t0 by detecting the rising edge of the feedback signal V<sub>ISNS</sub>. To prevent the noise of the feedback signal V<sub>ISNS</sub> from impacting the rising edge detection, preferably, the third comparator 1510 compares the feedback signal V<sub>ISNS</sub> with a threshold voltage Vref1 which is a little higher than zero, to filter any noise lower than the threshold voltage Vref1. The threshold voltage Vref1 maybe any voltage greater than zero and less than a valley value Vvalley (referring to FIGS. 6, 9B, 11B and 20, etc.), for example but not limited to 10% Vref. Next, the initial time point signal related to the initial time point t0, the first time point signal related to the first time point t1, and the second time point signal related to the second time point t2 are inputted to the pulse width generator circuit 1513. The pulse width generator circuit 1513 generates the first ON-time signal with a pulse width of T1 and the second ON-time signal with a pulse width of T2 according to t0, t1, and t2.

In this embodiment, the pulse width comparator 152 includes a first average circuit 1521 and a second average circuit 1522; both the first average circuit 1521 and the second average circuit 1522 are constructed by resistor-capacitor (RC) circuits for averaging and converting the first ON-time signal and the second ON-time signal to a first average signal and a second average signal respectively. The pulse width comparator 152 also includes an operational amplifier 1523 for comparing the first average signal and the second average signal, and outputting the comparison result to the extreme value adjustor circuit 153. The extreme value adjustor circuit 153 for example can be, but not limited to, an RC circuit as shown in this figure. The extreme value adjustor circuit 153 averages the comparison result of the pulse width comparator 152 to generate the peak signal Vpeak, and feeds the peak signal Vpeak back to the time detector circuit 151. By such closed loop control, the second ON-time T2 approaches the first ON-time T1.

Figure 14:
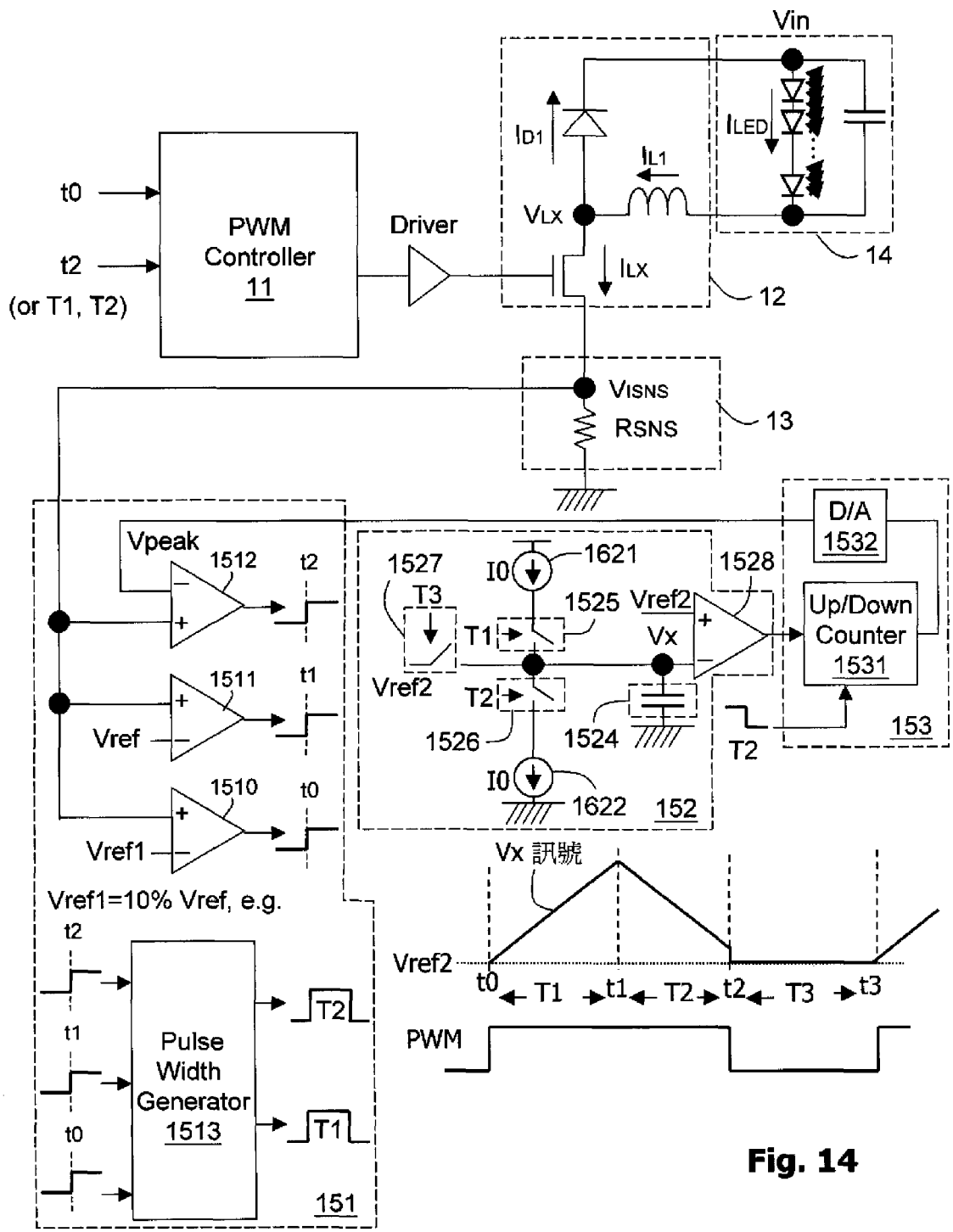

FIG. 14 shows another embodiment of the regulator with the closed loop ON-time controller. As shown in the figure, the time detector circuit 151 receives the feedback signal VIsns, and generates the first ON-time signal with a pulse width of T1 and the second ON-time signal with a pulse width of T2. The time detector circuit 151 is same as the one in the previous embodiment, so details thereof are omitted here. In this embodiment, the pulse width comparator 152 includes a first capacitor 1524, a first switch circuit 1525, a second switch circuit 1526, a third switch circuit 1527, a comparator 1528, a first current source 1621, and a second current source 1622. The pulse width comparator 152 changes the voltage of a node Vx at the upper end of the first capacitor 1524 by the operations of the switch circuits 1525-1527, to control the output of the comparator 1528.

More specifically, referring to the waveforms shown at the lower-right part of FIG. 14, in the first ON-time T1, the first switch circuit 1525 turns ON, and the first current source 1621 charges the first capacitor 1524 with a first current I0. In the second ON-time T2, the second switch circuit 1526 turns ON, and the second current source 1622 discharges the first capacitor 1524 with the first current I0. In a PWM signal OFF-time T3, the third switch circuit 1527 turns ON, such that the voltage Vx across the first capacitor 1524 is recovered to the base reference voltage Vref2. If the second ON-time T2 is shorter than the first ON-time T1, the voltage Vx will be higher than the base reference voltage Vref2 (as shown in this figure) at the end of the second ON-time T2. If the second ON-time T2 is equal to or greater than the first ON-time T1, the voltage Vx will be equal to or lower than the base reference voltage Vref2. The comparator 1528 compares the base reference voltage Vref2 with the voltage Vx across the first capacitor 1524, and outputs the comparison result to the extreme value adjuster circuit 153.

The extreme value adjustor circuit 153 includes an up/down counter 1531 and a digital-to-analog converter 1532. The up/down counter 1531 is enabled at the second time point t2 (in this embodiment, the up/down counter 1531 is enabled by the falling edge of the second ON-time signal). At the end of the second ON-time T2, the output of the comparator 1528 indicates the relationship between the voltage Vx and the base reference voltage Vref2, which corresponds to the relationship between the second ON-time T2 and the first ON-time T1. The up/down counter 1531 counts up or down according to the comparison result of the comparator 1528 to adjust the difference between the second ON-time T2 and the first ON-time T1. The digital-to-analog converter 1532 converts the digital count number outputted from the up/down counter 1531 to an analog peak signal Vpeak, which is fed back to the time detector circuit 151.

Figure 15:
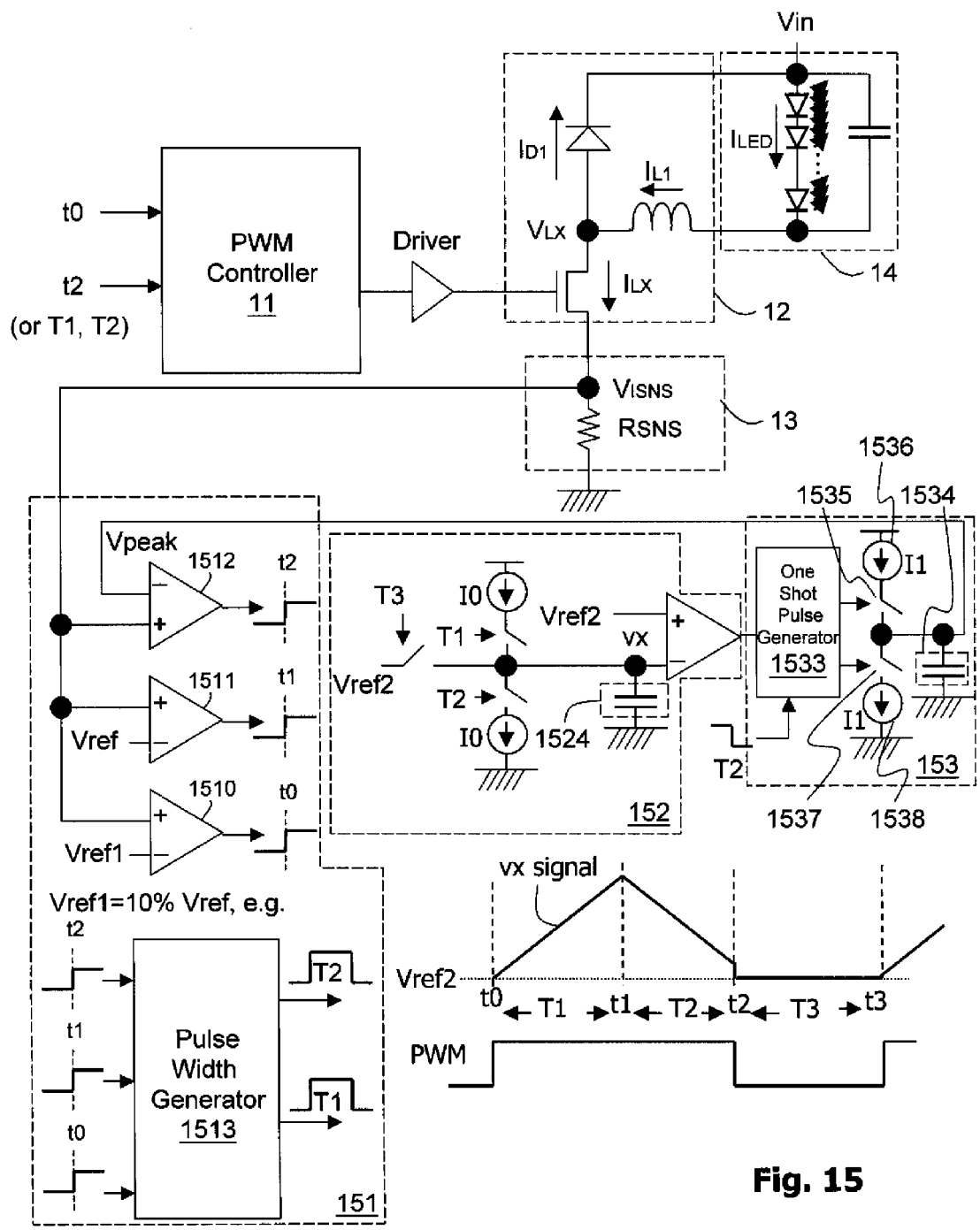

FIG. 15 shows another embodiment of the regulator with the closed loop ON-time controller. This embodiment is different from the embodiment shown in FIG. 14 in that the extreme value adjustor circuit 153 of this embodiment includes: a one-shot pulse generator 1533, a second capacitor 1534, a fourth switch circuit 1535, a third current source 1536, a fifth switch circuit 1537, and a fourth current source 1538. The overall function of the extreme value adjustor circuit 153 is similar to an analog counter which adjusts the voltage of the second capacitor 1534 by steps. More specifically, at the end of the second ON-time T2, if the base reference voltage Vref2 is higher than the voltage Vx of the first capacitor 1524, the one-shot pulse generator 1533 generates a one-shot charging signal which turns ON the fourth switch circuit 1535 for a short period; and if the base reference voltage Vref2 is lower than the voltage Vx of the first capacitor 1524, the one-shot pulse generator 1533 generates a one-shot discharging signal which turns ON the fifth switch circuit 1537 for a short period. When the one-shot charging signal is generated, the third current source 1536 charges the second capacitor 1534 with a second current I1; and when the one-shot pulse discharging signal is generated, the fourth current source 1538 discharges the second capacitor 1534 with a second current I1. The voltage across the second capacitor 1534 is the peak signal Vpeak. Comparing this embodiment to the embodiment of FIG. 14, it can be seen that the two embodiments are very similar to each other, except that this embodiment of FIG. 15 adjusts the voltage of the second capacitor 1534 by steps in an analog way, and therefore it does not need digital-to-analog conversion.

Figure 16:
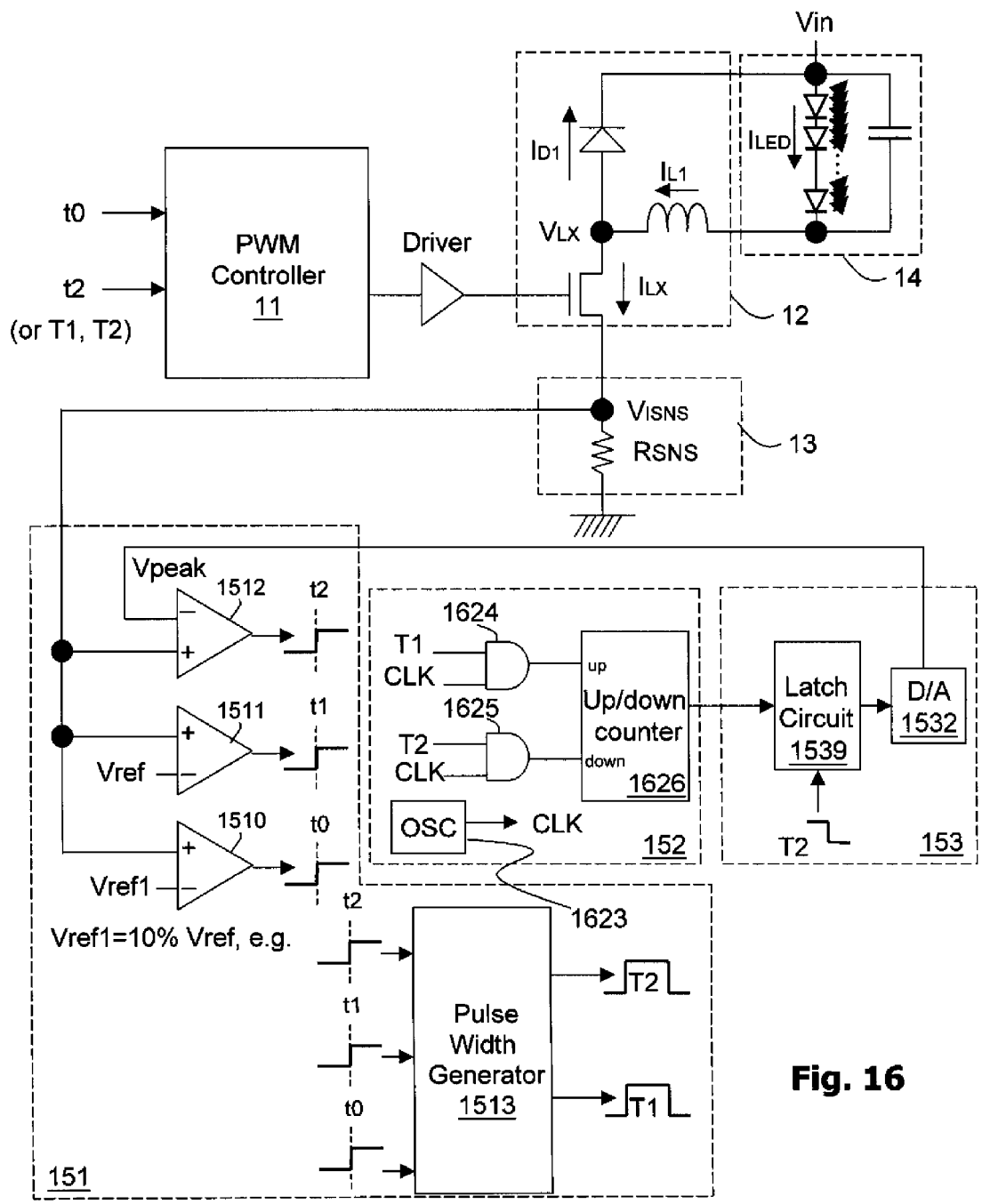

FIG. 16 shows another embodiment of the regulator with the closed loop ON-time controller. This embodiment is different from the embodiment shown in FIG. 14 in that the pulse width comparator 152 of this embodiment includes an oscillator 1623, a first AND gate 1624, a second AND gate 1625, and an up/down counter 1626; and the extreme value adjustor circuit 153 includes a latch circuit 1539 and a digital-to-analog converter 1532. The oscillator 1623 generates a clock signal CLK. The first ON-time signal and the clock signal CLK are subject to AND logic operation in the first AND gate 1624, and the first AND gate 1624 outputs an up count signal. The second ON-time signal and the clock signal CLK are subject to AND logic operation in the second AND gate 1625, and the second AND gate 1625 outputs a down count signal. The up/down counter 1626 counts up and down according to the up count signal and the down count signal respectively, and outputs a digital count number to the latch circuit 1539 of the extreme value adjustor circuit 153. That is, the pulse width comparator 152 calculates the time periods of the first ON-time T1 and the second ON-time T2 by the clock signal CLK, respectively; and the up/down counter 1626 counts up and down according to the time period of the first ON-time T1 and the second ON-time T2 and outputs the digital count number to the extreme value adjustor circuit 153. The latch circuit 1539 of the extreme value adjustor circuit 153 is enabled at the second time point t2 (in this embodiment, the latch circuit 1539 is enabled by the falling edge of the second ON-time signal). At the end of the second ON-time T2, the latch circuit 1539 receives and stores the digital count number outputted from the pulse width comparator 152. The digital-to-analog converter 1532 converts the digital count number stored in the latch circuit 1539 to the analog peak signal Vpeak, which is fed back to the time detector circuit 151.

Figure 17:
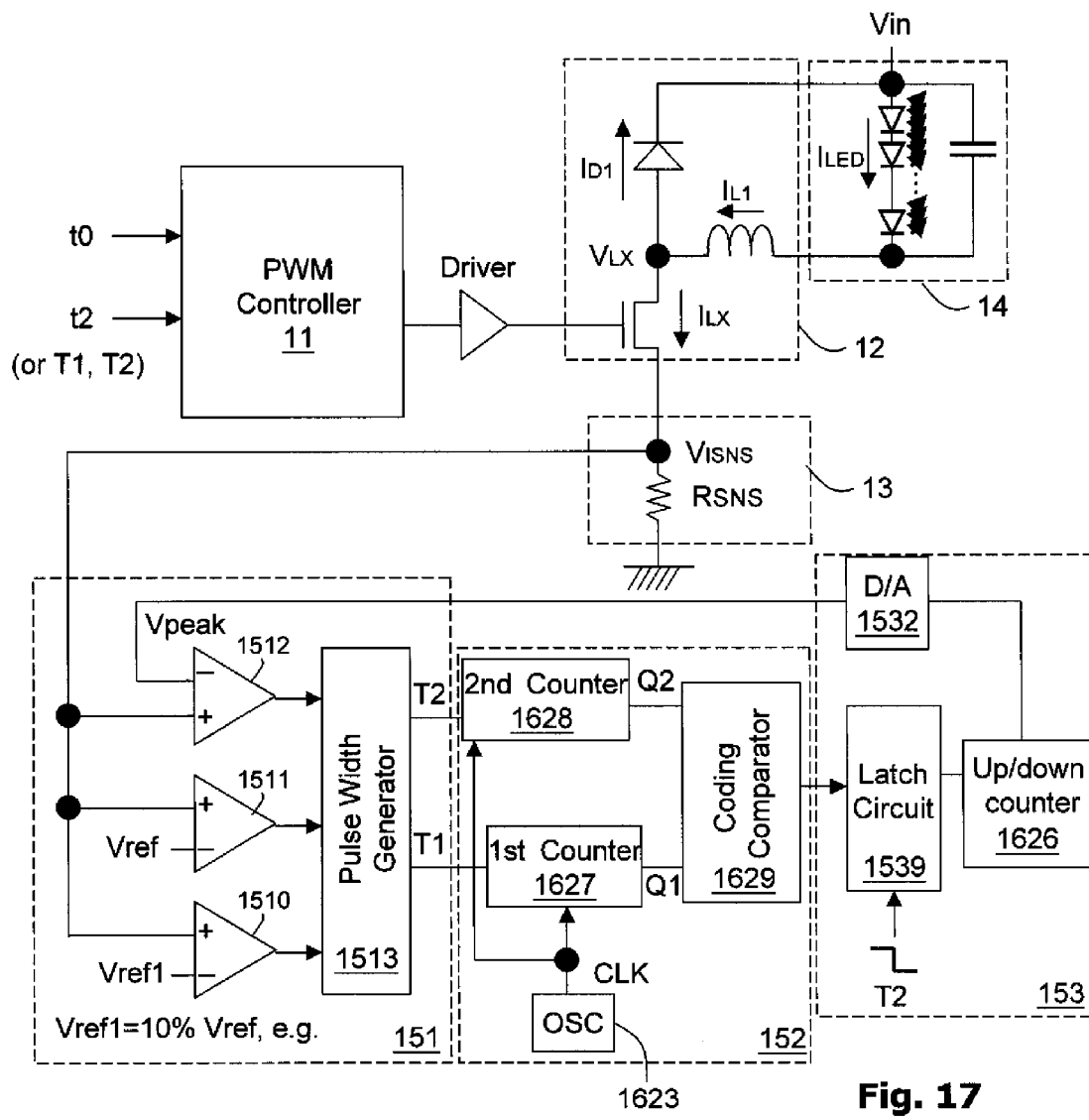

FIG. 17 shows another embodiment of the regulator with the closed loop ON-time controller. The difference between this embodiment and the embodiment shown in FIG. 14 is that, the pulse width comparator 152 includes the oscillator 1623, the first counter 1627, the second counter 1628, and a coding comparator 1629; and the extreme value adjustor circuit 153 includes the latch circuit 1539, the up/down counter 1626, and the digital-to-analog converter 1532. The oscillator 1623 generates the clock signal CLK. The first counter 1627 counts the length of the first ON-time T1 according to the clock signal CLK and generates a first count signal Q1. The second counter 1628 counts the length of the second ON-time T2 length according to the clock signal CLK and generates a second count signal Q2. The coding comparator 1629 compares the first count signal Q1 with the second count signal Q2, and encodes the comparison result to output a coding number to the latch circuit 1539 of the extreme value adjustor circuit 153. In the extreme value adjustor circuit, the latch circuit 1539 is enabled at the second time point t2 (in this embodiment, the latch circuit 1539 is enabled by the falling edge of the second ON-time signal). At the end of the second ON-time T2, the latch circuit 1539 receives and stores the digital count number outputted from the pulse width comparator 152. The digital-to-analog converter 1532 converts the digital count number stored in the latch circuit 1539 to the analog peak signal Vpeak, which is fed back to the time detector circuit 151.

Several embodiments with more specific circuit details will be described below for better illustrating the open loop control structure shown in FIG. 8B, FIGS. 11A-11B, and FIG. 12. It should be understood that the same concept can be embodied by many ways which cannot be all listed here. The embodiments below are for demonstrating that the present invention is practical, but not for limiting the scope of the present invention.

Figure 18:
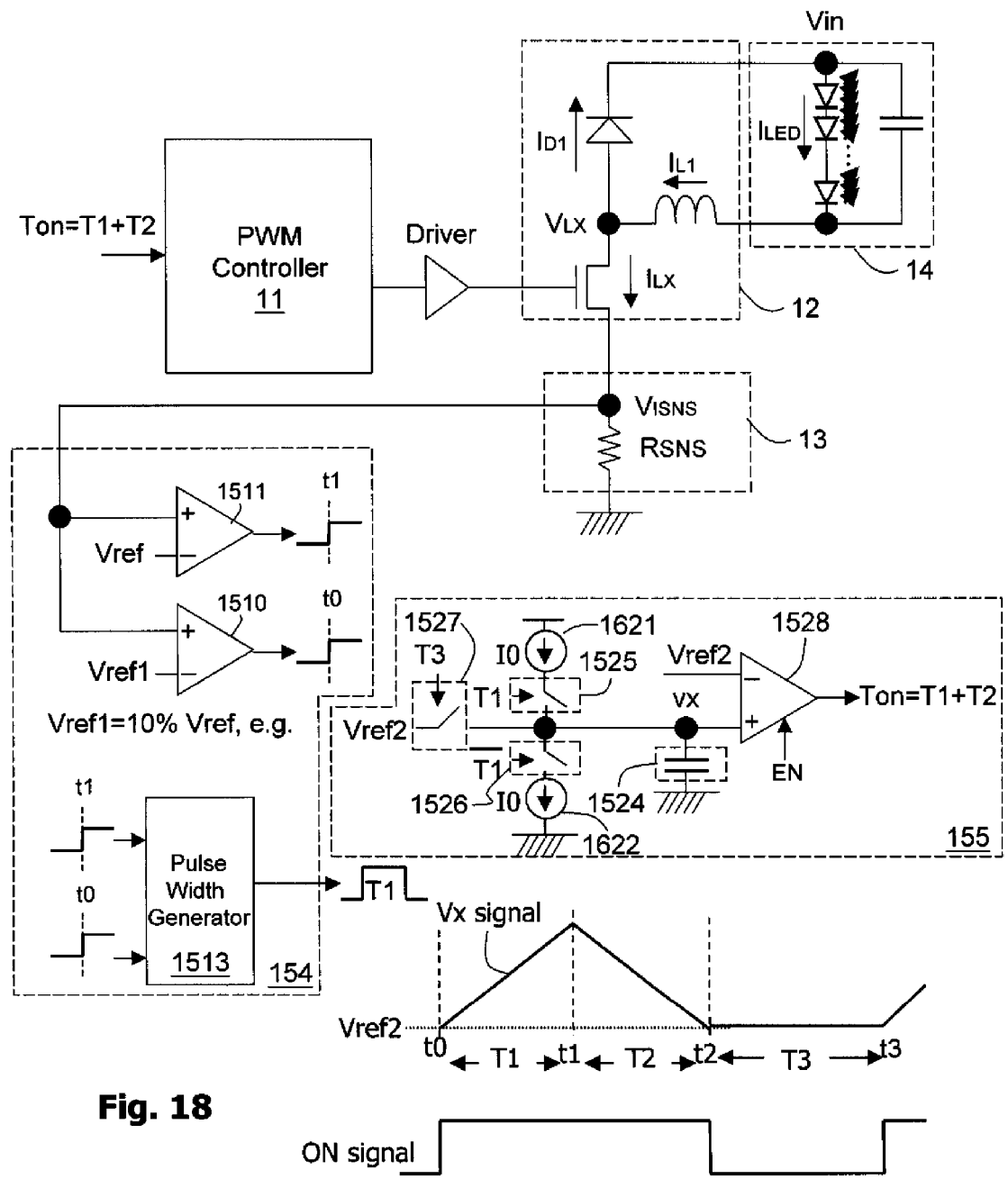
FIGS. 18-19 show embodiments of regulators with open loop ON-time controllers.

FIG. 18 shows a more specific embodiment of the regulator with the open loop ON-time controller. In this embodiment, the feedback signal $V_{ISNS}$ is inputted to the first comparator 1511 and the third comparator 1510 of the first ON-time detector circuit 154. The first comparator 1511 compares the feedback signal $V_{ISNS}$ and the average reference signal Vref, and generates a first time point signal accordingly. As shown in FIG. 18, the first time point signal switches level at the first time point t1. The third comparator 1510 compares the feedback signal $V_{ISNS}$ and a threshold voltage Vref1 to generate the initial time point signal, wherein the threshold voltage Vref1 for example can be, but not limited to, 10% Vref for filtering noises in the feedback signal $V_{ISNS}$. The initial time point signal switches level at the initial time point t0. The pulse width generator circuit 1513 receives the initial time point signal related to the initial time point t0, and the first time point signal related to the first time point t1. The pulse width generator circuit 1513 generates the first ON-time signal with a pulse width of T1 according to the initial time point signal and the first time point signal, and the first ON-time signal is inputted to the pulse width duplicator circuit 155.

The pulse width duplicator circuit 155 includes the first capacitor 1524, the first current source 1621, the second current source 1622, the first switch circuit 1525, the second switch circuit 1526, the third switch circuit 1527, and the comparator 1528. The pulse width duplicator circuit 155 changes the voltage of a node Vx at the upper end of the first capacitor 1524 by the operations of the switch circuits 1525-1527, to control the output of the comparator 1528 such that the high level period of the output of the comparator 1528 is about twice the first ON-time T1 (i.e., T1+T2).

More specifically, In the first ON-time T1, the first switch circuit 1525 turns ON, and the first current source 1621 charges the first capacitor 1524 with a first current I0. In the period other than the first ON-time T1, the second switch circuit 1526 turns ON, and the second current source 1622 discharges the first capacitor 1524 with the first current I0 till the voltage Vx is about the base reference voltage Vref2. And at this time point, the output of the comparator 1528 switches level, such that the PWM signal is OFF. In this PWM signal OFF-time T3, the third switch circuit 1527 turns ON, maintaining the voltage Vx across the first capacitor 1524 at the base reference voltage Vref2. The time period from when the first capacitor 1524 starts to discharge to the time when the voltage Vx substantially reaches the base reference voltage Vref2, is the second ON-time T2. Because the first capacitor 1524 is charged and discharged by about the same rate, the second ON-time T2 is about the same as the first ON-time T1; the ON-time of the PWM signal is T1+T2, which is about twice the first ON-time T1.

Figure 19:
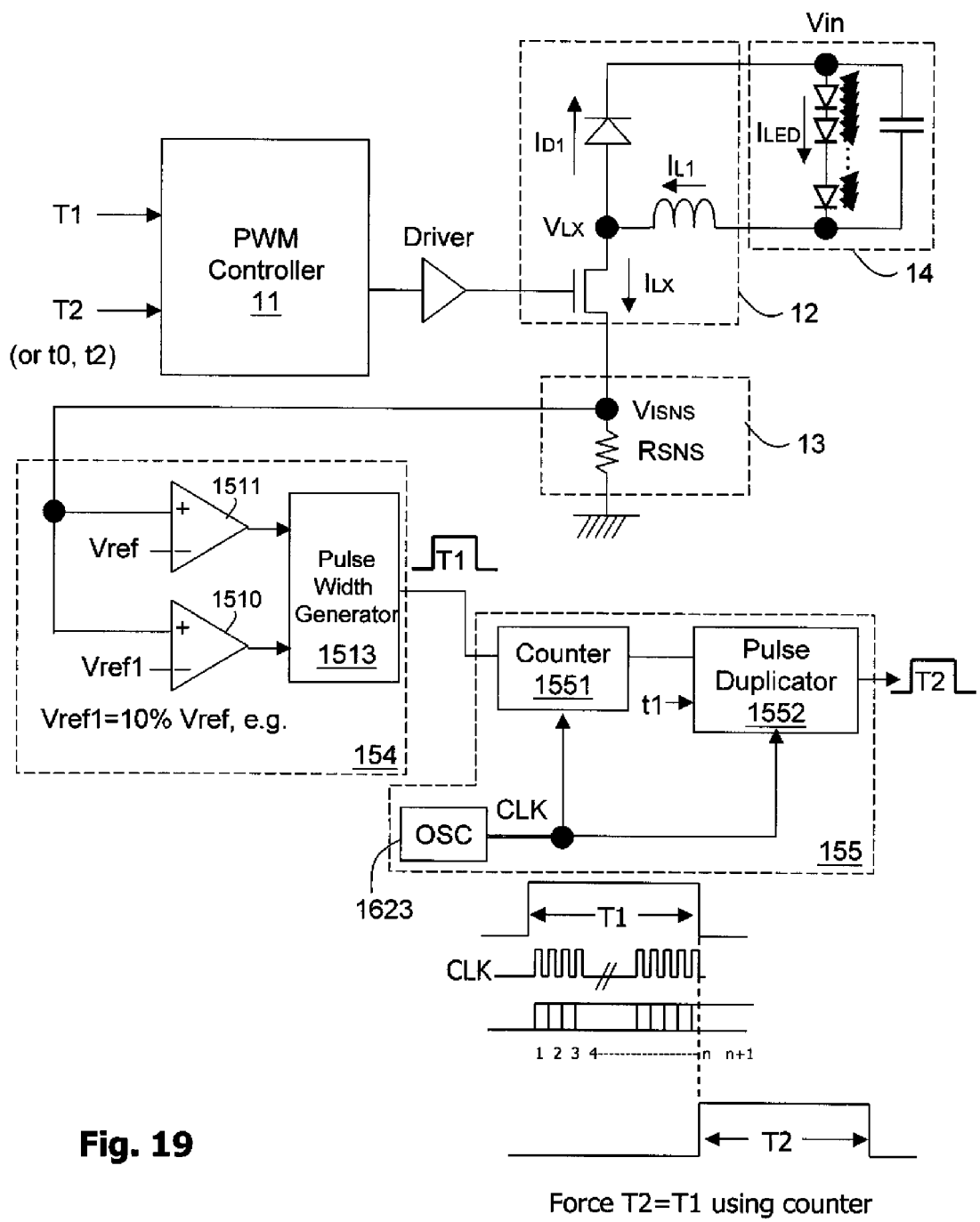

FIG. 19 shows another embodiment of the regulator with the open loop ON-time controller. This embodiment is different from the embodiment shown in FIG. 18 in that, the pulse width duplicator circuit 155 in this embodiment includes the oscillator 1623, the counter 1551, and the pulse duplicator circuit 1552. The oscillator 1623 generates the clock signal CLK. The counter 1551 counts the first ON-time T1 according to the clock signal CLK to generate a count number. The pulse duplicator circuit 1552 duplicates the first ON-time T1 to generate the second ON-time T2 according to the count number and the first time point signal. The PWM controller 11 can combine the first ON-time T1 and the second ON-time T2 to become the ON-time of the PWM signal, or determine the ON-time of the PWM signal according to the initial time point t0 and the second time point t2 (the falling edge of the second ON-time signal).

In all the embodiments mentioned above, the time point when the feedback signal $V_{ISNS}$ reaches the average reference signal Vref is determined as the first time point t1; the time period from the initial time point t0 to the first time point t1 is determined as the first ON-time T1; and the circuit controls the second ON-time T2 from the first time point t1 to the second time point t2 such that T2=T1. However, this is not the only way to embody the present invention; in the same spirit, it can be modified in such a way that the average reference signal Vref is set to other values, and the ratio of T2 to T1 is changed correspondingly. For example, the average reference signal Vref may be set to 90% of the target average value, and T2 is set to (11/9)*T1; or, the average reference signal Vref maybe set to 110% of the target average value, and T2 is set to (9/11)*T1, and so on. Such variations and modifications are certainly within the spirit of the present invention. In other words, if the first ON-time T1 is defined as the time period from the initial time point t0 when the power transistor is turned ON, to the time point when the feedback signal reaches the average reference signal Vref, then in accordance with the setting of the average reference signal Vref, the second ON-time T2 would be a ratio of the first ON-time T1, i.e., T2=α·T1, wherein a is a positive real number, and α=1 is only one f the preferred embodiments. To embody different a values in the embodiments mentioned above, the following factors can be modified: the current(s) of the current source(s), the input setting(s) of the comparator(s), or the frequency(ies) of the clock(s) (in the embodiments of FIGS. 16 and 17, T1 and T2 can be counted by different clock signals of different frequencies); in the embodiment of FIG. 19, the pulse duplicator circuit 1552 can be modified such that it generates the second ON-time T2 which is a times T1, etc. In light of the above, the term "average reference signal Vref" used throughout the specification of this invention only means that this signal relates to the average value, but does not mean that it strictly corresponds to 100% of the average value.

Figure 20:
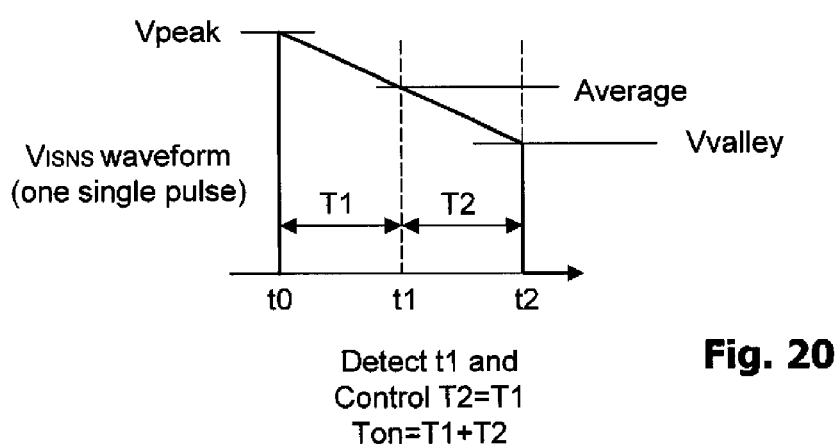
FIG. 20 shows that the present invention also can be applied to the condition wherein the feedback signal has a downward slope waveform.

Further, referring to FIG. 20, in some applications, the feedback signal $V_{ISNS}$ may have a downward slope waveform as shown; in this case, the spirit of the present invention can still be applied to control T2=T1, such that the ON-time of the PWM signal is equal to T1+T2 and the average output current is regulated to a predetermined target. Under such circumstance, the "extreme value adjustor circuit" or the peak signal Vpeak in the aforementioned embodiments should be correspondingly modified to a "valley adjustor circuit" or a valley signal Vvalley. In the present invention, the term "extreme" may mean "peak" or "valley".

Figure 1:
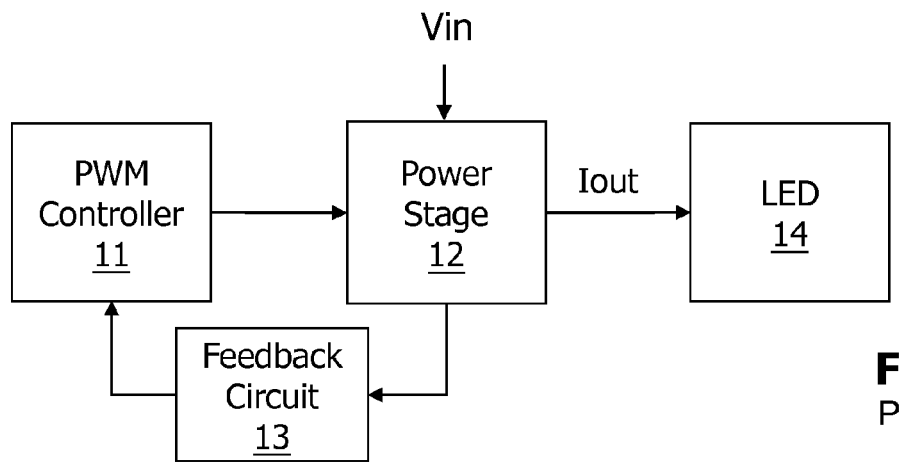
FIG. 1 shows a circuit diagram of a typical current regulator
Figure 2A:
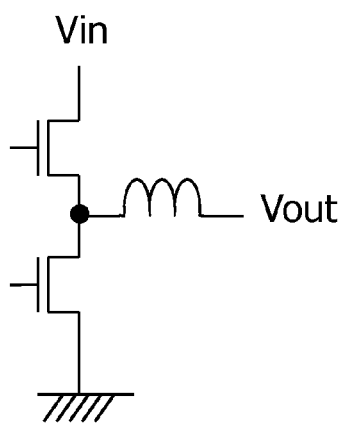
FIGS. 2A-2I show synchronous and asynchronous buck, boost, inverting and buck-boost converters.
Figure 2B:
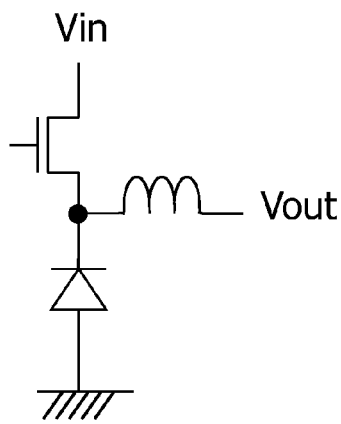
Figure 2C:
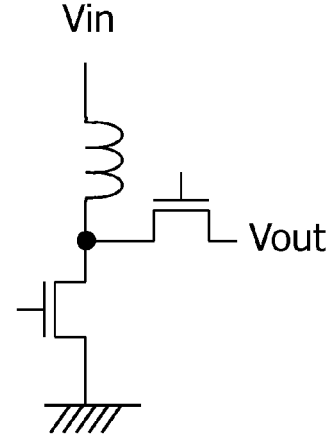
Figure 2D:
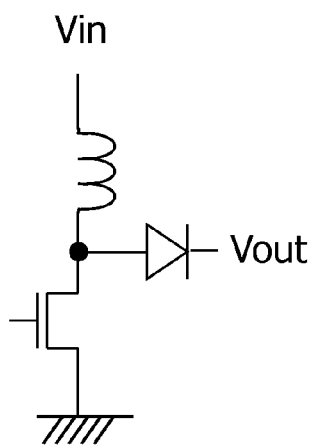
Figure 2E:
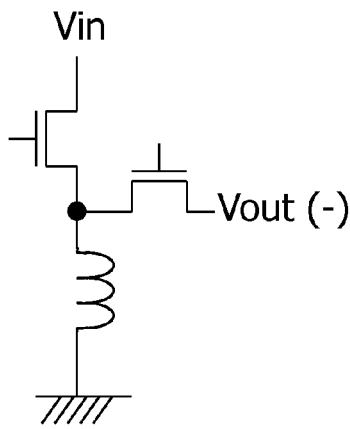
Figure 2F:
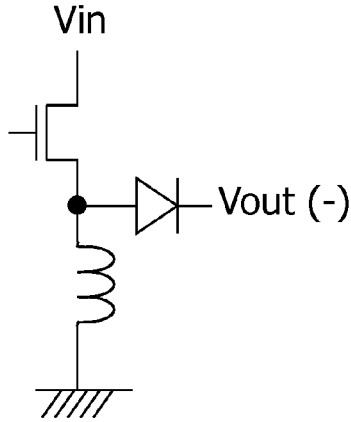
Figure 2G:
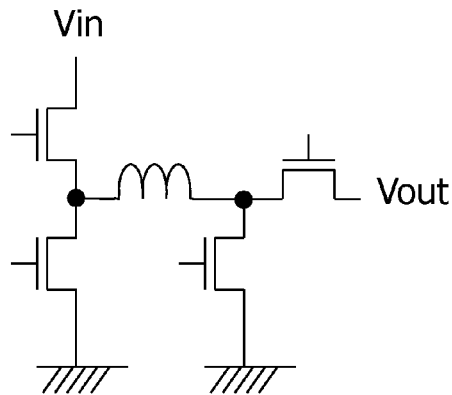
Figure 2H:
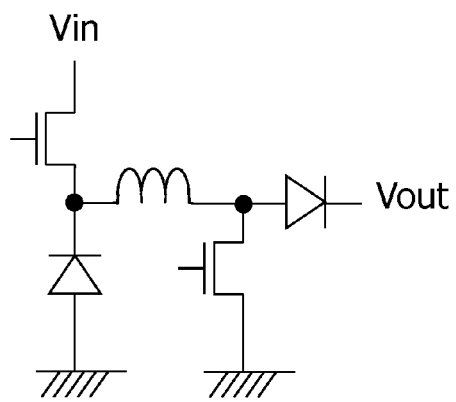
Figure 2I:
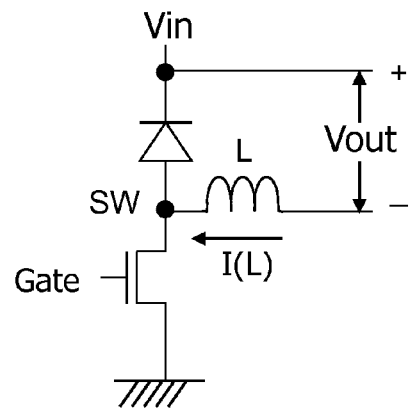
Figure 3:
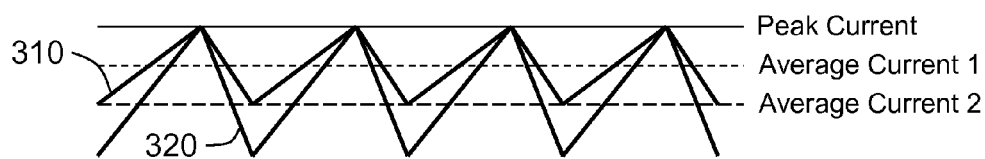
FIG. 3 shows that the average currents of two current signals are different even though the peak currents of the two current signals are the same in the prior art.
Figure 4:
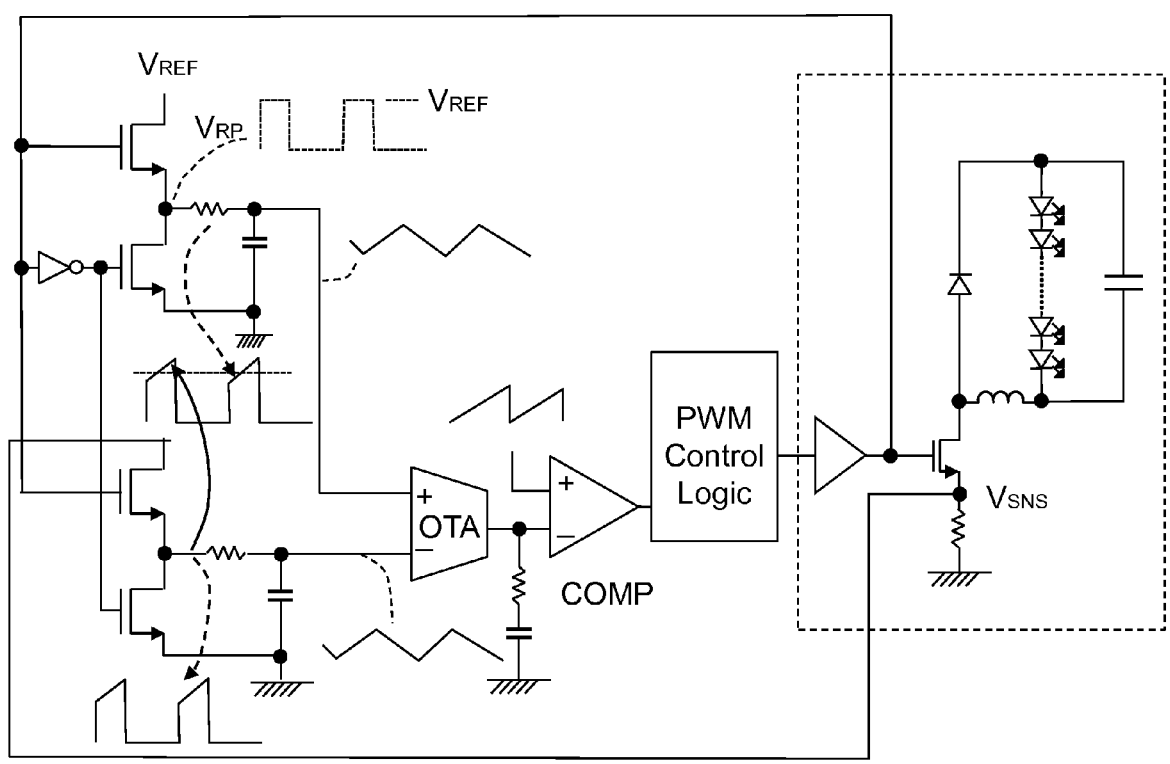
FIG. 4 shows a prior art circuit for controlling average current.
Figure 5:
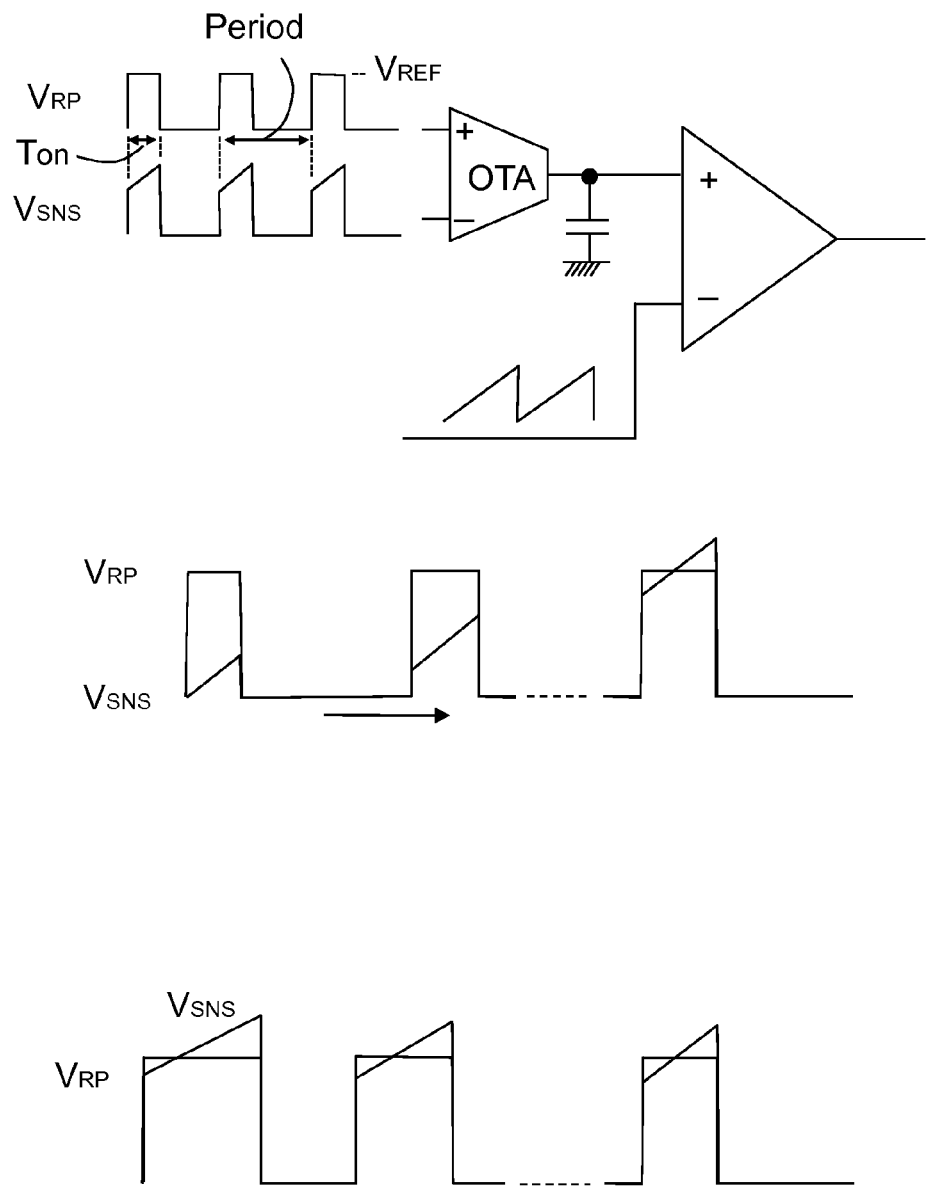
FIG. 5 shows the mechanism for controlling average current in the prior art of FIG. 4.

Compared with the prior art, the present invention is advantageous in that it regulates the average output current to the predetermined target, and in comparison with U.S. Pat. No. 7,388,359, (by referring to FIGS. 9B and 11B in conjunction with FIG. 5), the spike noise occurring in the beginning of the signal switching does not impact the accuracy of the present invention in detecting the average value, but this noise will impact the calculation of the average output current in U.S.

Pat. No. 7,388,359. Therefore, the present invention is more accurate than U.S. Pat. No. 7,388,359 in the calculation of the PWM signal ON-time.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device such as a switch or the like, which does not substantially influence the primary function of a signal, can be inserted between any two devices in the circuits of the aforementioned embodiment. The meanings of high and low levels of a digital signal may be interchanged; for example, the first and second ON-time T1 and T2 may be represented by low levels of a digital signal, and in this case, the second time point t2 would be determined by the rising edge of the second ON-time T2. For another example, the positive and negative input terminals of the comparators 1510, 1511, and 1512 are interchangeable, and the AND gate 1624 and 1625 may be replaced by other logic circuits, with corresponding amendment of the circuits processing these signals. All of these should be included within the scope of the present invention.

What is claimed is:

1. An average current regulator comprising:
   a power stage including at least one power transistor which switches according to a pulse width modulation (PWM) signal to convert an input voltage to an output current;
   a feedback circuit coupled to the power stage for generating a feedback signal, wherein the feedback signal has an extreme value;
   an ON-time controller coupled to the feedback circuit for receiving the feedback signal, and generating an ON-time signal according to the feedback signal and an average reference signal related to a target average current; and
   a PWM controller generating the PWM signal according to the ON-time signal to regulate an average of the output current to the target average current.

2. The average current regulator of claim 1, wherein the ON-time controller obtains a first ON-time which is a period of time from an initial time point when the power transistor is turned ON to a time point when the feedback signal reaches the average reference signal, and generates a second ON-time proportional to the first ON-time, wherein the ON-time of the PWM signal is the sum of the first ON-time and the second ON-time.

3. The average current regulator of claim 2, wherein the ON-time controller includes:
   a time detector circuit receiving the feedback signal, the average reference signal, and an extreme signal related to the extreme value of the feedback signal, and generating a first ON-time signal having the first ON-time and a second ON-time signal having the second ON-time;
   a pulse width comparator comparing the pulse widths of the first ON-time signal and the second ON-time signal, and outputting the comparison result; and
   an extreme value adjustor circuit adjusting the extreme signal according to the comparison result of the pulse width comparator and feeding back the extreme signal to the time detector circuit, such that the second ON-time approaches a target ratio of the first ON-time.

4. The average current regulator of claim 3, wherein the time detector circuit includes:
   a first comparator comparing the feedback signal with the average reference signal to determine a first time point which relates to an end time point of the first ON-time signal;
   a second comparator comparing the feedback signal with the extreme signal to determine a second time point which relates to an end time point of the second ON-time signal; and
   a pulse width generator generating the first ON-time signal and the second ON-time signal according to the initial time point, the first time point, and the second time point.

5. The average current regulator of claim 4, wherein the time detector circuit further includes: a third comparator comparing the feedback signal with a threshold voltage to determine the initial time point, wherein the threshold voltage is greater than zero and less than a valley value of the feedback signal.

6. The average current regulator of claim 3, wherein the pulse width comparator includes:
   a first average circuit averaging the first ON-time signal to generate a first average signal;
   a second average circuit averaging the second ON-time signal to generate a second average signal; and
   an average signal comparator comparing the first average signal with the second average signal and outputting the comparison result.

7. The average current regulator of claim 6, wherein the extreme value adjustor circuit includes a resistor-capacitor circuit averaging the comparison result of the pulse width comparator to generate the extreme signal, and feeds back the extreme signal to the time detector circuit.

8. The average current regulator of claim 3, wherein the pulse width comparator includes:
   a first capacitor charged by a first current in the first ON-time, discharged by the first current in the second ON-time, and recovered to a base reference voltage when the PWM signal is OFF; and
   a comparator comparing the base reference voltage with the voltage of the first capacitor, and outputting the comparison result.

9. The average current regulator of claim 8, wherein the extreme value adjustor circuit includes:
   an up/down counter for up/down counting according to the comparison result of the pulse width comparator, and outputting a digital count; and
   a digital to analog converter converting the digital count to the extreme signal which is fed back to the time detector circuit.

10. The average current regulator of claim 8, wherein the extreme value adjustor circuit includes:
    a one-shot pulse generator generating a one-shot charging signal when the base reference voltage is greater than the voltage of the first capacitor, and generating a one-shot discharging signal when the base reference voltage is smaller than the voltage of the first capacitor; and
    a second capacitor charged by a second current when the one-shot charging signal is generated, and discharged by the second current when the one-shot discharging signal is generated, wherein the extreme signal is determined by the voltage of the second capacitor.

11. The average current regulator of claim 3, wherein the pulse width comparator includes:
    an oscillator generating a clock signal;
    a first logic gate counting the length of the first ON-time according to the clock signal to generate an up count signal;

a second logic gate counting the length of the second ON-time according to the clock signal to generate an down count signal; and an up/down counter for up/down counting according to the up count signal and the down count signal, and outputting its count.

12. The average current regulator of claim 11, wherein the extreme value adjustor circuit includes:

a latch circuit enabled at the second time point to store the count outputted from the pulse width comparator, the latch circuit outputting a digital number; and a digital to analog converter converting the digital number to the analog extreme signal which is fed back to the time detector circuit.

13. The average current regulator of claim 3, wherein the pulse width comparator includes:

an oscillator generating a clock signal;

a first counter counting the length of the first ON-time according to the clock signal to generate a first count signal;

a second counter counting the length of the second ON-time according to the clock signal to generate a second count signal; and a coding comparator comparing the first count signal with the second count signal, and generate a coded comparison result.

14. The average current regulator of claim 13, wherein the extreme value adjustor circuit includes:

a latch circuit enabled at the second time point to store the coded comparison result outputted from the pulse width comparator, the latch circuit outputting a coded signal;

an up/down counter for up/down counting according to the coded signal, and outputting a digital count; and a digital to analog converter converting the digital count to the analog extreme signal which is fed back to the time detector circuit.

15. The average current regulator of claim 2, wherein the ON-time controller includes:

a first ON-time detector circuit receiving the feedback signal and the average reference signal, and generating a first ON-time signal having the first ON-time; and a pulse width duplicator circuit coupled to the first ON-time detector circuit, for generating a second ON-time signal having the second ON-time according to the first ON-time signal.

16. The average current regulator of claim 15, wherein the first ON-time detector circuit includes:

a first comparator comparing the feedback signal with the average reference signal to determine a first time point which relates the end time point of the first ON-time signal; and a pulse width generator generating the first ON-time signal according to the initial time point and the first time point.

17. The average current regulator of claim 16, wherein the first ON-time detector circuit further includes: a second comparator comparing the feedback signal with a threshold voltage to determine the initial time point, wherein the threshold voltage is greater than zero and less than a valley value of the feedback signal.

18. The average current regulator of claim 15, wherein the pulse width duplicator circuit includes:

a capacitor charged by a first current in the first ON-time, discharged by the first current in the time other than the first ON-time, and recovered to a base reference voltage when the PWM signal is OFF; and a comparator comparing the base reference voltage and the voltage of the capacitor, and outputting the ON-time signal.

19. The average current regulator of claim 15, wherein the pulse width duplicator circuit includes:

an oscillator generating a clock signal;

a counter counting the length of the first ON-time according to the clock signal, to generate a count signal; and a pulse duplicator generating the second ON-time signal according to the count signal and a first time point which relates to an end time point of the first ON-time.

20. An average current regulator driver circuit for driving a power stage, wherein the power stage has at least one power transistor which switches according to a pulse width modulation (PWM) signal to convert an input voltage to an output current, and the power stage is coupled to a feedback circuit which generates a feedback signal, the driver circuit comprising:

an ON-time controller coupled to the feedback circuit for receiving the feedback signal, and generating an ON-time signal according to the feedback signal and an average reference signal related to a target average current; and a PWM controller generating the PWM signal according to the ON-time signal to regulate an average of the output current to the target average current.

21. The driving circuit of claim 20, wherein the ON-time controller obtains a first ON-time which is a period of time from an initial time point when the power transistor is turned ON to a time point when the feedback signal reaches the average reference signal, and generates a second ON-time proportional to the first ON-time according to the first ON-time, wherein the ON-time of the PWM signal is the sum of the first ON-time and the second ON-time.

22. The driving circuit of claim 21, wherein the feedback signal has an extreme value, and wherein the ON-time controller includes:

a time detector circuit receiving the feedback signal, the average reference signal, and an extreme signal related to the extreme value of the feedback signal, and generating a first ON-time signal having the first ON-time and a second ON-time signal having the second ON-time;

a pulse width comparator comparing the pulse width of the first ON-time signal and the second ON-time signal, and outputting the comparison result; and an extreme value adjustor circuit adjusting the extreme signal according to the comparison result of the pulse width comparator and feeding back the extreme signal to the time detector circuit, such that the second ON-time approaches a target ratio of the first ON-time.

23. The driving circuit of claim 22, wherein the time detector circuit includes:

a first comparator comparing the feedback signal with the average reference signal to determine a first time point which relates to an end time point of the first ON-time signal;

a second comparator comparing the feedback signal with the extreme signal to determine a second time point which relates to an end time point of the second ON-time signal; and a pulse width generator generating the first ON-time signal and the second ON-time signal according to the initial time point, the first time point, and the second time point.

24. The driving circuit of claim 23, wherein the time detector circuit further includes: a third comparator comparing the feedback signal with a threshold voltage to determine the initial time point, wherein the threshold voltage is greater than zero and less than the valley value of the feedback signal.

25. The driving circuit of claim 22, wherein the pulse width comparator includes:
a first average circuit averaging the first ON-time signal to generate a first average signal;
a second average circuit averaging the second ON-time signal to generate a second average signal; and
an average signal comparator comparing the first average signal with the second average signal and outputting the comparison result.

26. The driving circuit of claim 25, wherein the extreme value adjustor circuit includes a resistor-capacitor circuit averaging the comparison result of the pulse width comparator to generate the extreme signal which is fed back to the time detector circuit.

27. The driving circuit of claim 22, wherein the pulse width comparator includes:
a first capacitor charged by a first current in the first ON-time, discharged by the first current in the second ON-time, and recovered to a base reference voltage when the PWM signal is OFF; and
a comparator comparing the base reference voltage with the voltage of the first capacitor, and outputting the comparison result.

28. The driving circuit of claim 27, wherein the extreme value adjustor circuit includes:
an up/down counter for up/down counting according to the comparison result of the pulse width comparator, and outputting a digital count; and
a digital to analog converter converting the digital count to the extreme signal which is fed back to the time detector circuit.

29. The driving circuit of claim 27, wherein the extreme value adjustor circuit includes:
a one-shot pulse generator generating a one-shot charging signal when the base reference voltage is greater than the voltage of the first capacitor, and generating a one-shot discharging signal when the base reference voltage is smaller than the voltage of the first capacitor; and
a second capacitor charged by a second current when the one-shot charging signal is generated, and discharged by the second current when the one-shot discharging signal is generated, wherein the extreme signal is determined by the voltage of the second capacitor.

30. The driving circuit of claim 22, wherein the pulse width comparator includes:
an oscillator generating a clock signal;
a first logic gate counting the length of the first ON-time according to the clock signal to generate an up count signal;
a second logic gate counting the length of the second ON-time according to the clock signal to generate an down count signal; and
an up/down counter for up/down counting according to the up count signal and the down count signal, and outputting its count.

31. The driving circuit of claim 30, wherein the extreme value adjustor circuit includes:
a latch circuit enabled at the second time point to store the count outputted from the pulse width comparator, the latch circuit outputting a digital count number; and
a digital to analog converter converting the digital count number to the extreme signal which is fed back to the time detector circuit.

32. The driving circuit of claim 22, wherein the pulse width comparator includes:

an oscillator generating a clock signal;
a first counter counting the length of the first ON-time according to the clock signal to generate a first count number;
a second counter counting the length of the second ON-time according to the clock signal to generate a second count number; and
a coding comparator comparing the first count number with the second count number, and generate a coded comparison result.

33. The driving circuit of claim 32, wherein the extreme value adjustor circuit includes:
a latch circuit enabled at the second time point to store the coded comparison result outputted from the pulse width comparator, the latch circuit outputting a coded signal;
an up/down counter for up/down counting according to the coded signal, and outputting a digital count; and
a digital to analog converter converting the digital count to the extreme signal which is fed back to the time detector circuit.

34. The driving circuit of claim 21, wherein the ON-time controller includes:
a first ON-time detector circuit receiving the feedback signal and the average reference signal, and generating a first ON-time signal having the first ON-time; and
a pulse width duplicator circuit coupled to the first ON-time detector circuit, for generating a second ON-time signal having the second ON-time according to the first ON-time signal.

35. The driving circuit of claim 34, wherein the first ON-time detector circuit includes:
a first comparator comparing the feedback signal with the average reference signal to determine a first time point which relates the end time point of the first ON-time signal; and
a pulse width generator generating the first ON-time signal according to the initial time point and the first time point.

36. The driving circuit of claim 35, wherein the first ON-time detector circuit further includes: a second comparator comparing the feedback signal with a threshold voltage to determine the initial time point, wherein the threshold voltage is greater than zero and less than a valley value of the feedback signal.

37. The driving circuit of claim 34, wherein the pulse width duplicator circuit includes:
a capacitor charged by a first current in the first ON-time, discharged by the first current in the time other than the first ON-time, and recovered to a base reference voltage when the PWM signal is OFF; and
a comparator comparing the base reference voltage and the voltage of the capacitor, and outputting the ON-time signal.

38. The driving circuit of claim 34, wherein the pulse width duplicator circuit includes:
an oscillator generating a clock signal;
a counter counting the length of the first ON-time according to the clock signal, to generate a count number; and
a pulse duplicator generating the second ON-time signal according to the count signal and a first time point which relates to an end time point of the first ON-time.

39. A method for regulating average current comprising:
switching at least one power transistor of a power stage according to a pulse width modulation (PWM) signal to convert an input voltage to an output current;
generating a feedback signal according to the output current, wherein the feedback signal has an extreme value;

receiving the feedback signal, and generating an ON-time signal according to the feedback signal and an average reference signal related to a target average current; and generating the PWM signal according to the ON-time signal to regulate an average of the output current to the target average current.

40. The method of claim 39, wherein the step of generating an ON-time signal includes:

obtaining a first ON-time which is a period of time from an initial time point when the power transistor is turned ON to a time point when the feedback signal reaches the average reference signal; and generating a second ON-time proportional to the first ON-time, wherein the ON-time of the PWM signal is the sum of the first ON-time and the second ON-time.

41. The method of claim 39, wherein the step of generating an ON-time signal includes:

obtaining the time point when the power transistor is turned ON as an initial time point;

comparing the feedback signal with the average reference signal to determine a first time point;

comparing the feedback signal with the extreme signal to determine a second time point;

generating a first ON-time signal having a first ON-time according to the initial time point and the first time point;

generating a second ON-time signal having a second ON-time according to the first time point and the second time point;

comparing the pulse width of the first ON-time signal and the second ON-time signal; and feedback adjusting the extreme signal according to a result of the pulse width comparison, such that the second ON-time approaches a target ratio of the first ON-time.

42. The method of claim 41, wherein the initial time point is determined by the following step: comparing the feedback signal with a threshold voltage, wherein the threshold voltage is greater than zero and less than a valley value of the feedback signal.

43. The method of claim 39, wherein the step of generating an ON-time signal includes:

obtaining the time point when the power transistor is turned ON as an initial time point;

comparing the feedback signal with the average reference signal to determine a first time point;

generating a first ON-time signal having a first ON-time according to the initial time point and the first time point; and proportionally duplicating the first ON-time signal to generate a second ON-time signal having a second ON-time, wherein the second ON-time is proportional to the first ON-time.

44. The method of claim 43, wherein the initial time point is determined by the following step: comparing the feedback signal with a threshold voltage, wherein the threshold voltage is greater than zero and less than a valley value of the feedback signal.

* * * * *